United States Patent [19]

Tabata et al.

[11] Patent Number: 4,679,778
[45] Date of Patent: Jul. 14, 1987

[54] FLUID-CONTAINING POWER UNIT MOUNTING DEVICE

[75] Inventors: Toshikazu Tabata, Sagamihara; Yoshinari Fujiwara, Yachiyo; Norio Yoda, Yotsukaido; Hiroshi Aikawa, Atsugi, all of Japan

[73] Assignees: Nissan Motor Co., Ltd., Kanagawa; Kinugawa Rubber Ind. Co. Ltd., Chiba, both of Japan

[21] Appl. No.: 919,624

[22] Filed: Oct. 15, 1986

Related U.S. Application Data

[63] Continuation of Ser. No. 696,386, Jan. 30, 1985, abandoned.

[30] Foreign Application Priority Data

Jan. 30, 1984 [JP] Japan .................................. 59-13414

[51] Int. Cl.$^4$ .................. F16M 5/00; B60G 15/04; G05D 11/00; F16K 51/00
[52] U.S. Cl. .................. 267/140.1; 137/117; 137/512; 137/808; 248/562; 248/659; 251/117; 267/8 R
[58] Field of Search .................. 267/113, 8 R, 140.1, 267/35, 153; 188/322.22, 298; 248/562, 636, 659; 251/117; 137/117, 512, 512.1, 493.9, 808, 809, 814

[56] References Cited

U.S. PATENT DOCUMENTS

| 4,159,091 | 6/1979 | Le Saiver et al. | 267/140.1 X |
| 4,383,679 | 5/1983 | Kakimoto | 267/140.1 X |
| 4,418,895 | 12/1983 | Bertin et al. | 267/140.1 |
| 4,422,779 | 12/1983 | Hamaekers et al. | 267/81 R X |

FOREIGN PATENT DOCUMENTS

| 40290 | 11/1981 | European Pat. Off. | 267/140.1 |
| 3140783 | 4/1983 | Fed. Rep. of Germany | 267/140.1 |
| 3142673 | 5/1983 | Fed. Rep. of Germany | 267/140.1 |
| 54279 | 3/1983 | Japan | 137/512 |
| 814748 | 6/1959 | United Kingdom | 267/140.1 |

Primary Examiner—Andres Kashnikow
Assistant Examiner—Robert J. Oberleitner
Attorney, Agent, or Firm—Schwartz, Jeffery, Schwaab, Mack, Blumenthal & Evans

[57] ABSTRACT

A fluid-containing power unit mounting device capable of effectively damping vibration in a wide range of frequency is shown. The damping function of the device is accomplished by a mounting rubber forming an internal fluid-containing chamber between a power unit and a chassis, a partition plate dividing the chamber and including a plurality of valve mechansims in series and an orifice communicating between both sides of the chamber.

6 Claims, 7 Drawing Figures

FLUID-CONTAINING POWER UNIT MOUNTING DEVICE

This application is a continuation of application Ser. No. 696,386, filed Jan. 30, 1985, now abandoned.

BACKGROUND OF THE INVENTION

1. Field of the Invention

The present invention relates to a power unit mounting device.

2. Description of the Related Art

In a conventional power unit mounting device, a mounting rubber, which has an internal space in which a fluid is enclosed, is fixed between the power unit side base and the chassis side base, and on one base side there is formed a secondary compartment which is divided by a diaphragm and a partition plate. A fluid chamber is formed between this partition plate and the other base side. Also provided in this partition plate is one valve mechanism which moves when subjected to high frequency vibrations and is constrained when subjected to low frequency high amplitude vibrations, and an orifice equipped with a movable plate. This orifice serves to connect the secondary chamber and the fluid chamber.

When high amplitude vibrations in the low frequency range are applied to this conventional type of fluid-containing power unit mounting device, the fluid flowing through the orifice is subjected to a damping force. For low amplitude vibrations at high frequencies, the movable plate on the valve mechanism moves, and the dynamic spring constant of the mounting mechanism is constrained in a specific range. Accordingly, a high degree of damping is provided to prevent engine vibration produced at the resonant frequency, for example, 5 to 13 Hz. When the dynamic spring constant is reduced on a mounting device so that the valve mechanism resonates to prevent that noise at higher frequencies which produce noise (for example, 100 to 170 Hz), at a higher frequency than this, say at a high frequency range of about 250 Hz for example, the resonant point is exceeded and the valve mechanism does not operate well. The dynamic spring constant in the mounting mechanism increases and produces a worsening effect so that the problem arises that high frequency vibration from the combustion of the engine is transmitted to the chassis.

In general, for the valve mechanism a spring system is formed for which, if the equivalent mass is m*, and if the sum of the diaphragm rigidity and mounting rubber rigidity is k, then the resonant frequency (f) becomes:

$$f = \frac{1}{2\pi} \cdot \sqrt{\frac{k}{m^*}}$$

If the cross-sectional area of the internal space in the mounting rubber is $A_1$, the effective cross-sectional area of the valve mechanism $A_2$, and the fluid moving in the vicinity of the valve mechanism has a mass of $m_o$ at microvibrations, then the equivalent mass $m^* = m'_o(A_1/A_2)^2$.

SUMMARY OF THE INVENTION

An object of the present invention is to provide a fluid-containing power unit mounting device which effectively prevents vibration from transmitting from a power unit to a chassis.

Another object of the present invention is to provide a fluid-containing power unit mounting device by which noise due to vibrations of the power unit can be considerably reduced.

A further object of the present invention is to provide a fluid-containing power unit mounting device with a dynamic spring constant which has a low value even at high frequency above the resonant frequency thereof as well as at low frequency.

These and other objects and advantages are accomplished by provision of a fluid-containing power unit mounting device comprising a power unit side base, a chasis side base, a mounting rubber fixed to and between the two bases to form an internal chamber therein, a diaphragm and a partition plate which are provided on one of the base plates and which form a secondary chamber therebetween chambers are partitioned by the partition plate, a plurality of valve mechanisms provided on the partition plate in series, and an orifice communicating the internal chamber with the secondary chamber.

Accordingly, high damping force is provided by the orifice against high amplitude vibrations at the low frequency range which produce engine vibration. For low amplitude vibration at the high frequency range which produces noise, the dynamic spring constant of the mounting device is reduced by the action of the valve mechanisms. As a result, even when subjected to the rather elevated high frequency vibrations, the dynamic spring constant of the mounting mechanism is lowered from the action of the valve mechanisms arranged in series, in comparison with a valve mechanism of the same characteristics provided as a single unit, making it possible to reduce the transmission to the chassis of the high frequency microvibrations caused by the engine combustion.

BRIEF DESCRIPTION OF THE DRAWINGS

These and other objects, features and advantages of the present invention will become more apparent from the following description of preferred embodiments taken in conjunction with the accompanying drawings, in which.

DESCRIPTION OF THE PREFERRED EMBODIMENTS

Following is a description of the preferred embodiments of the present invention, with reference to the drawings.

Figure 1:
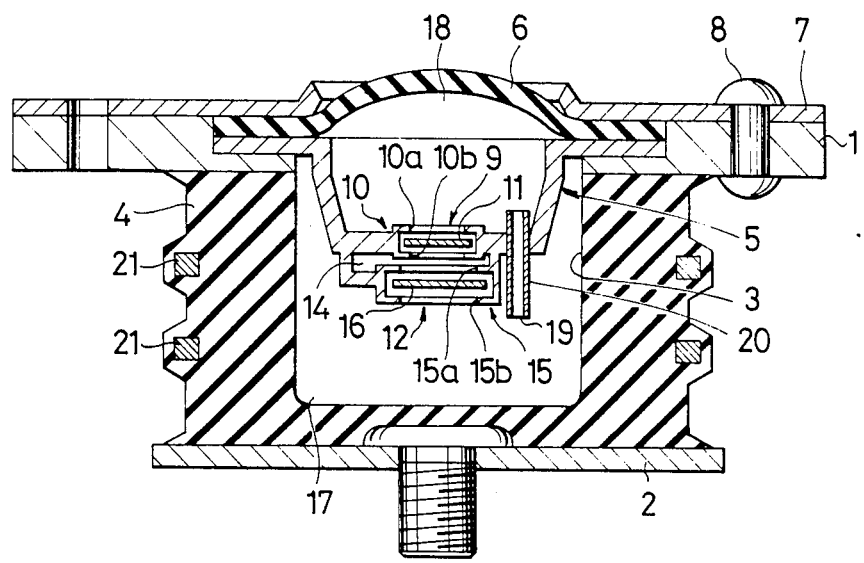
FIG. 1 is a section view showing the first embodiment of the present invention.

Now referring to FIG. 1, a first embodiment of the present invention is shown.

A mounting rubber 4, which contains a inner compartment 3, is attached between a power unit side base 1 and a chassis side base 2 by vulcanizing. With a diaphragm 6 forming the outer side, both a partition plate 5 and the diaphragm 6 are interposed at their outer circumferential edge between the base 1 and a cover 7, and secured by means of a rivet 8. Rings 21 are embedded in the mounting rubber 4 to prevent the rubber 4 from contraction.

The partition plate 5 comprises a first valve mechanism 9 and a second valve mechanism 12, which move from the effect of high frequency vibrations (for example, 100 to 170 Hz) and are constrained by low frequency high amplitude vibrations (for example 5 to 13 Hz), together with an orifice 19. The first valve mechanism 9 is provided at the upper side of the center section of the partition plate 5, and it comprises an annular section 10 which has a squared groove formed from a pair of stoppers 10a and 10b, and a movable plate 11, which is fitted in a freely movable manner between the stoppers 10a and 10b.

In addition, on the lower side of the center section of the partition plate 5, the second valve mechanism 12 which, in the same way, moves from the effect of high frequency vibrations and is constrained at low frequency high amplitude vibrations, is positioned in series with the first valve mechanism 9. That is, on the lower side of the center section of the partition plate 5, a center chamber 14 is formed, and an annular section 15 which has a squared groove made up of a pair of stoppers 15a and 15b is provided. Between these stoppers 15a and 15b a movable plate 16 is fitted in a freely movable manner. In this way, a fluid chamber 17 is formed between the partition plate 5 and the base 2, and a secondary chamber 18 is formed between the partition plate 5 and the diaphragm 6. Fluid is contained in both the chambers 17 and 18, and in the center chamber 14.

In addition, an orifice 19, which acts as a constricted flow channel connecting the secondary chamber 18 and the fluid chamber 17, is formed in a tubular member 20 mounted on the partition plate 5.

Here, the frequency $f_1$, at which the maximum damping capacity of the orifice 19 is indicated, depends on the mass of the fluid within the orifice 19 and on the diameter of the orifice 19. As this mass increases, the frequency $f_1$ decreases, and as the diameter decreases, the frequency $f_1$ decreases. Also, as the diameter increases, the damping capacity increases.

Next the operation of the present invention will be explained.

When a low frequency (for example 5 to 13 Hz) large amplitude vibration which produces engine vibration, is input from the base 1, the mounting rubber 4 expands and contracts in large amounts, and thus produces a capacity change in the fluid chamber 17. As a result, the movable plates 11 and 16 are respectively stopped by the stoppers 10a and 15a, or by the stoppers 10b or 15b of the annular sections 10 or 15, and the first valve mechanism 9 or the second valve mechanism 12 is constrained, and the fluid mass in the orifice 19 resonates, producing a large damping force.

For the input of a noise-producing, low amplitude, high frequency vibration (for example 100 to 170 Hz) the variation rate of the fluid chamber 17 under pressure is large, so that the fluid is unable to pass through the orifice 19, and is confined to the fluid chamber 17. In this case, when the mounting rubber 4 expands or contracts, both the valve mechanisms 9 and 12 operate.

That is, both the movable plates 11 and 16 move between the stoppers 10a and 15a and the stoppers 10b and 15b, so that the dynamic spring constant is reduced, and the transmission to the chassis of a low amplitude vibration in the high frequency range of 100 to 170 Hz is decreased.

In more detail, because a high damping effect is obtained from the orifice 19, the static spring constant of the mounting rubber 4 in a low frequency range can be set comparatively low in the mounting mechanism as opposed to an individual mounting rubber. In turn, conjointly with the operation of the valve mechanisms 9 and 12, the dynamic spring constant of the mounting rubber 4 at a high frequency range (for example $\phi$ to 170 Hz) drops.

In the range where the dynamic spring constant increases which is somewhat higher than a rather high frequency range (for example, about 250 Hz) where noise is produced, this effect can be decreased by installing the valve mechanisms 9 and 12 in series. That is, if the dynamic spring constant of the first valve mechanism 9 is $k_1$, and the dynamic spring constant of the second valve mechanism 12 is $k_2$, the total dynamic spring constant K, when they are positioned in series becomes $$K = \frac{k_1 k_2}{k_1 + k_2}$$

and the two valve mechanisms 9 and 12 in series, as opposed to the case where they are positioned independently, provide a reduction in the dynamic spring constant k, making it possible to reduce the dynamic spring constant of the mounting device.

Figure 4:
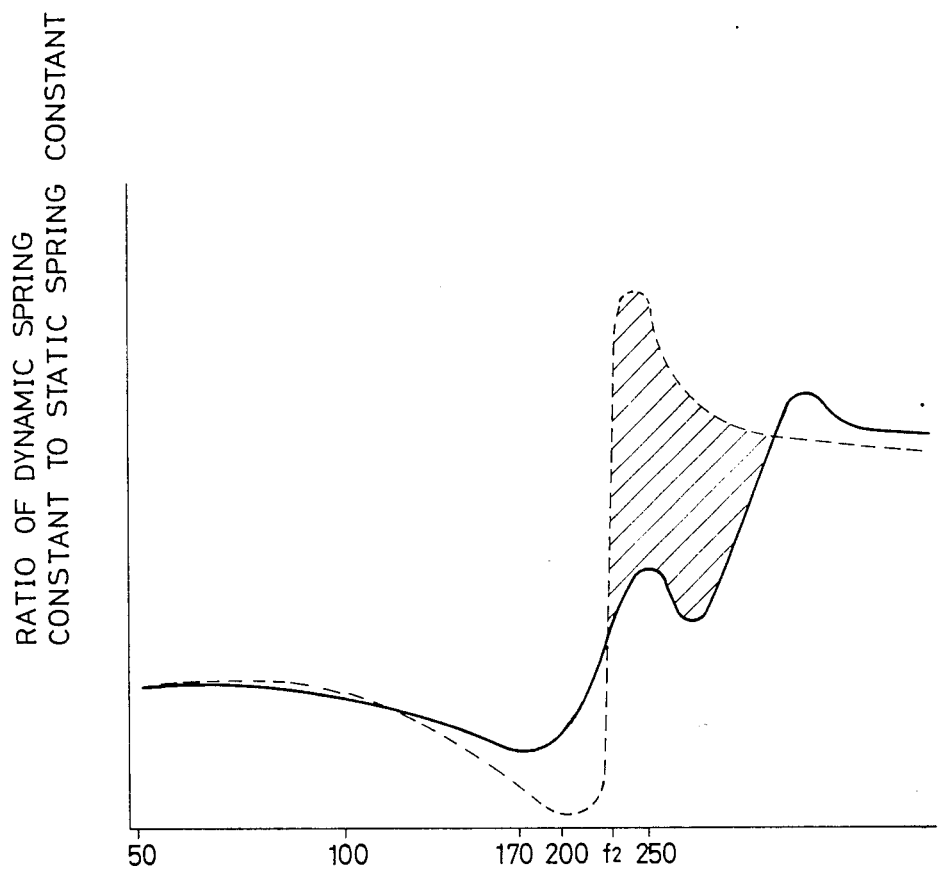
FIG. 4 is a graph showing the relationship between the ratio of dynamic spring constant to static spring constant and the frequency characteristics of the first embodiment of the present invention.

This can be more specifically explained by referring to the test results given in FIG. 4. The vertical axis of the graph gives the ratio of dynamic spring constant to static spring constant, while the horizontal axis indicates the frequency in Hz. The broken line shows the characteristics of a conventional fluid-containing power unCit mounting device, while the solid line indicates the characteristics of the first embodiment of the fluid-containing power unit mounting device of the present invention.

This graph shows that, in the 100 to 170 Hz range a reduction in the dynamic spring constant is provided, and in the high frequency range from the resonant frequency $f_2$, and in the region indicated by the slanted lines, the increase in dynamic spring constant can be appreciably suppressed. Therefore it is possible to reduce the transmission of high frequency vibrations to the chassis in the frequency range in the neighborhood of 250 Hz. In addition, the maximum value of the dynamic spring constant is also reduced.

Figure 2:
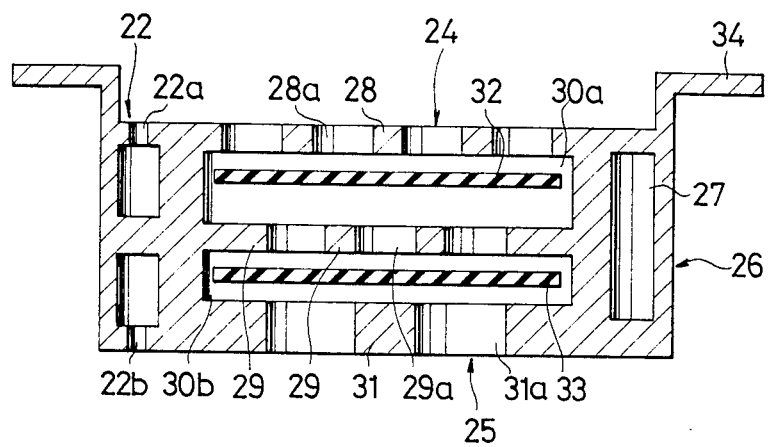
FIG. 2 is a section view of a partition plate which provides an integrated orifice and valve mechanism according to the present invention.

FIG. 2 shows an enlarged view of a partition plate 26 which comprises an orifice 22, formed as a constricted flow channel, together with a first valve mechanism 24 and a second valve mechanism 25 arranged in series.

A fluid channel 27 is formed in a spiral shape on the external periphery of the partition plate 26 with its cross section area which takes maximum value at its middle portion, and the fluid channel 27 communicates with one side of the partition plate 26 at one end thereof through a constricted section 22a of the orifice 22, and with the other side of the partition plate 26 at the other side thereof through a constricted section 22a of the orifice 22. In addition, in the center section of the partition plate 26, an upper plate 28 which is a stopper with a plurality of orifices 28a, a middle plate 29 which is a stopper with a plurality of orifices 29a, and a lower plate 31 which is a stopper with a plurality of orifices 31a, serve to form an upper compartment 30a and a lower compartment 30b. A movable plate 32 is housed in the upper compartment 30a, forming a first valve mechanism 24, while a movable plate 33 is housed in the lower compartment 30b forming a second valve mechanism 25. Accordingly, the first valve mechanism 24 which is moved by high frequency vibrations and constrained by low frequency high amplitude vibrations, is arranged in series with the second valve mechanism 25. This partition plate 26 is incorporated in a fluid-containing power unit mounting device in which a flange 34 is pressed between the base 1 and the cover 7, in the same way as in the first embodiment of the present invention.

In this type of construction, the movable plate 32 moves between the upper plate 28 and the middle plate 29, and the movable plates 33 moves between the middle plate 29 and the lower plate 31 from the effect of high frequency vibrations, and under the influence of low frequency high amplitude vibrations, these movable plates are stopped on the upper plate 28, middle plate 29, or lower plate 31. In addition to providing the same operation as in the first embodiment, the diameters of the constricted sections 22a and 22b can be set comparatively large to obtain a high damping characteristic for low frequency vibrations because the communication channel 27 interposed between the constricted sections 22a and 22b of the orifice has a larger cross-sectional area than the cross-sectional areas of the constricted sections 22a and 22b and a comparatively large mass therein. In addition, because the movable plates 32 and 33 are broadly supported by the middle sections besides the peripheral sections of the upper plate 28, middle plate 29 and lower plate 31, they can be constructed from a flexible material such as rubber or elastomer.

Figure 3:
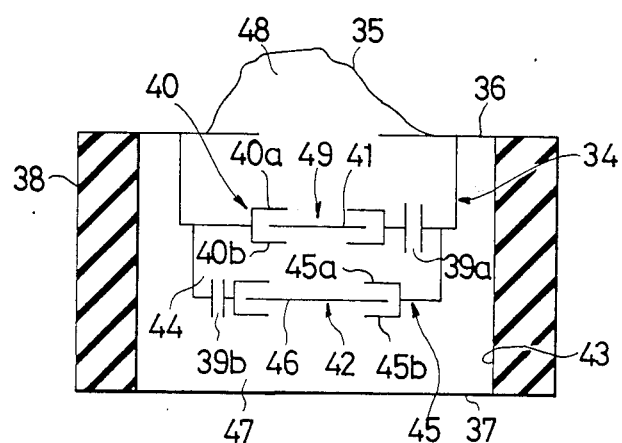
FIG. 3 is a conceptional section view showing a second embodiment of the present invention.

FIG. 3 is a conceptional sectional drawing showing a second embodiment of the present invention.

The configuration of this embodiment is essentially the same as that of the first embodiment of the present invention. It comprises a power unit side base 36, a chassis side base 37, an internal space 43, a mounting rubber 38, a partition plate 34, a diaphragm 35, a second valve mechanism 49, annular section 40, a plurality of stoppers 40a and 40b, a movable plate 41, a second valve mechanism 42, a center chamber 44, an annular section 45, a plurality of stoppers 45a and 45b, a movable plate 46, a fluid chamber 47, and a secondary chamber 48. A fluid is contained in the fluid chamber 47 and secondary chamber 48, as well as in the center chamber 44.

In this embodiment of the present invention, an orifice is provided in the partition plate 45 and connects the fluid chamber 47 and secondary chamber 48 and comprises a constricted section 39a which communicates between the secondary chamber 48 and the center chamber 44 which is the center section of the orifice, a constricted section 39b which communicates between the center chamber 44 and the secondary chamber 47, and the center chamber 44.

In addition to obtaining the same action from this embodiment as from the first embodiment of the present invention, it is possible to set the diameter of the constricted sections 39a and 39b comparatively large to increase the damping capacity with its maximum capacity at a preferred low frequency, because a comparatively large capacity center chamber 44 is interposed between the constricted sections 39a and 39b which has a larger cross-sectional area than the cross-sectional areas of the constricted sections 39a and 39b themselves.

Figure 5:
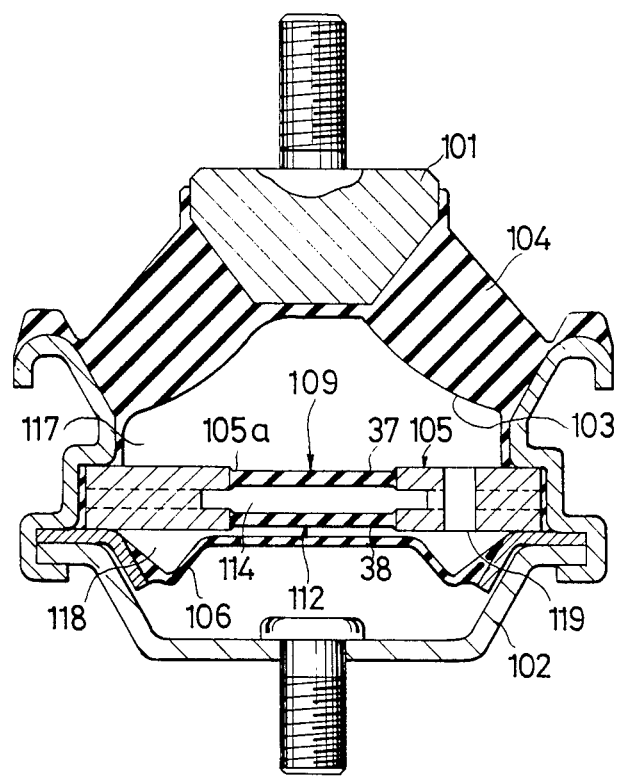
FIG. 5 is a section view showing a third embodiment of the present invention.

FIG. 5 is a sectional drawing showing a third embodiment of the present invention.

This embodiment comprises a power unit side base 101, a chassis side base 102, an internal space 103, a mounting rubber 104, a partition plate 105, a diaphragm 106, a fluid chamber 117, and a secondary chamber 118. The fluid chamber 117 is formed on the side of the base 101, and the secondary chamber 118 is formed on the side of the base 102. A fluid is contained in the fluid chamber 117 and the secondary chamber 118.

In the partition plate 105, first and second valve mechanisms 109 and 112 which are positioned in series and an orifice 119 functioning as a constricted flow channel, are formed as an integral unit.

The orifice 119 is drilled as a small hole at the external circumference of the partition plate 105, and connects the fluid chamber 117 with the secondary chamber 118. In addition, a through hole 105a is formed in the center section of the partition plate 105. On the upper side of this through hole 105a is formed a thin film flexible member 37 buried with a fibrous member and principally made of rubber or elastomer. The outer circumferential edge of the flexible member 37 is fixed in the partition plate 105, and forms the first valve mechanism 109. On the lower side of the through hole 105a, a flexible member 38 is secured by adhesive in the same way, forming the second valve mechanism 112, and creates a middle chamber 114 which contains fluid. In this manner, the first valve mechanism 109, which moves from the effect of high frequency vibrations and is constrained by low frequency, high amplitude vibrations, and the second valve mechanism 112, are arranged in series.

With this embodiment of the present invention, the flexible members 37 or 38 undergo a specific amount of elastic deformation from the input of low frequency, high amplitude vibrations from the base 101, and after the first valve mechanism 109 or the second valve mechanism 112 is constrained by the tension of the fibrous member, the mass of the liquid in the orifice 119 resonates and a large damping effect is produced. For high frequency input which generates noise, both the flexible members 37 and 38 undergo elastic distortion, and the dynamic spring constant of the mounting member is lowered, and the vibration transmitted to the chassis is reduced. In addition, in the high frequency vibration range where the dynamic spring constant of the mounting device is increased, the transmitting amount of high frequency vibration can be diminished because the two valve mechanisms 109 and 112 are mounted in series.

Furthermore, the characteristics of the first valve mechanism 109 and the second valve mechanism 112 can be changed by varying the respective rigidity of the flexible members 37 or 38, making it possible to set the value for the dynamic spring constant of the mounting device at the optimum value according to a type of a vehicle.

Figure 6:
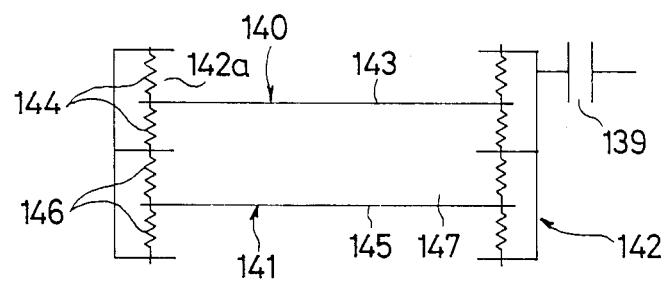
FIG. 6 is a conceptional view showing another example of the structure of a partition plate.

FIG. 6 is a conceptional drawing showing another example of the structure of a partition plate 142 which is integrally formed from a first valve mechanism 140 and a second valve mechanism 141 arranged in series and a constricted flow channel orifice 139.

A through hole 142 is formed in the center section of the partition plate 142, and on the upper side of this through hole 142 a plate member 143 is connected in a vertically movable manner to the partition plate 142 through a flexible body 144 on the external circumferential ring of the partition plate 142, to form the first valve mechanism 140. On the lower side of this through hole 142 a plate member 145 is connected in a vertically movable manner to the partition plate 142 through a flexible body 146 on the external circumferential ring of the partition plate 142 to form the second valve mechanism 141. A center chamber 147, which contains fluid, is formed between the two plate members 143 and 145. In addition, an orifice 139 is provided on the outer perimeter of the partition plate which allows communication between both sides of the partition plate 142.

In this manner, the first valve mechanism 140 which moves under the influence of high frequency vibrations and is constrained by low frequency high amplitude vibrations, and the second valve mechanism 141, are positioned in series with the partition plate 142.

When this partition plate 142 is incorporated in a mounting device, the tabular plates 143 and 145 move under the influence of high frequency vibrations with aid of the elastic distortion of the flexible bodies 144 and 146, and this movement is constrained by the flexible bodies 144 and 146 under the influence of low frequency high amplitude vibrations, giving an action the same as obtained with the first embodiment of the present invention.

Figure 7:
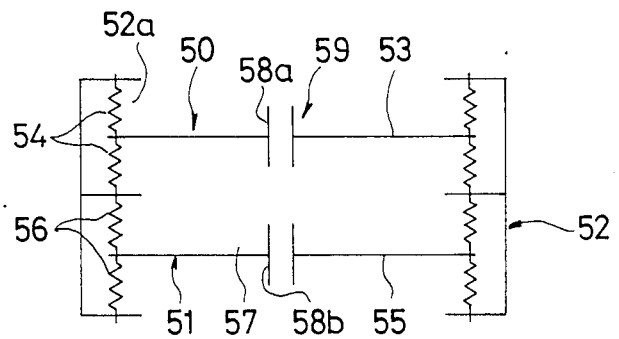
FIG. 7 is a conceptional view showing still another example of the structure of a partition plate.

Furthermore, in this construction example, as shown in FIG. 7, an orifice 139 formed in a partition plate 142 is formed between a plurality of constricted sections 58a and 58b provided in a plurality of plate members 53 and 55, and these members 53 and 55 form a center chamber 57 in which fluid is housed. The action of this example is the same as in the second embodiment of the present invention. This embodiment also comprises a first valve mechanism 50, a second valve mechanism 51, a through hole 142, and a plurality of flexible bodies 54 and 56.

It will now be apparent that the present invention provides an improved fluid-containing power unit mounting device. However, it is to be understood that the previous embodiments of the invention are shown for illustrative purposes only and that various modifications and alterations may be made to it without departing the spirit and scope of the invention. As an example, a partition plate as described above may be provided with more than two valve mechanisms which move under the influence of high frequency vibrations and which are constrained by low frequency high amplitude vibrations.

What is claimed is:

1. A fluid-containing power unit mounting device comprising:
    a first base plate for attachment to a power unit;
    a second base plate for attachment to a chassis;
    a mounting rubber interposed between said first and second base plates to form an internal chamber therein;
    a diaphragm and a partition plate means, each having a perimeter, provided on one of said first and second base plates to form a secondary chamber therebetween wherein said internal and secondary chambers are partitioned by said partition plate means;
    first and second serially connected valve means each for restricting communication in at least two directions between the internal and secondary chambers and for reducing a total spring constant of the mounting device provided on the partition plate means, each of said first and second valve means having a compartment disposed in the partition plate means and a movable plate freely movable within the compartment, said partition plate means having orifices for communicating the internal chamber with the secondary chamber through the compartment of each of the first and second valve means; and
    a fluid channel means communicating the internal chamber with the secondary chamber to reduce high frequency vibration of the mounting device, said chambers and said channel being filled with a working fluid.

2. A fluid-containing power unit mounting device as claimed in claim 1, wherein said fluid channel means has first and second openings respectively communicated with the secondary chamber and the internal chamber and having a communicating channel communicated with the first and second openings, the cross-sectional area of the communicating channel being greater than that of each of the first and second openings to reduce the low frequency vibration of the mounting device, said chambers and said fluid channel means being filled with the working fluid through the orifices, the first and second openings and the communicating channel.

3. A fluid-containing power unit mounting device as claimed in claim 2, wherein said communicating channel is formed between the first and second valve means.

4. A fluid-containing power unit mounting device comprising:
    a first base plate for attachment to a power unit;
    a second base plate for attachment to a chassis;
    a mounting rubber interposed between said first and second base plate to form an internal chamber therein;
    a diaphragm and a partition plate means provided on one of said first and second base plates to form a secondary chamber therebetween wherein said internal and secondary chambers are partitioned by said partition plate means;
    first and second serially connected valve means each of restricting communication in at least two directions between the internal and secondary chambers and for reducing a total spring constant of the mounting device provided on the partition plate means, said first and second valve means respectively having plate members connected to the partition plate means through elastic members for absorbing the vibration of the mounting device, said plate members forming therebetween a central chamber filled with a working liquid; and
    orifice means disposed in the partition plate means to communicate the internal and secondary chambers with each other.

5. A fluid-containing power unit mounting device as claimed in claim 4, wherein said orifice means is disposed in the partition plate means.

6. A fluid-containing power unit mounting device as claimed in claim 4, wherein said orifice means comprises constricted sections communicating the central chamber with said internal and secondary chambers and disposed in the plate members.

* * * * *